United States Patent

Konno

[15] 3,688,043

[45] Aug. 29, 1972

[54] TIMER CIRCUIT OF AN AUTOMATIC TELEPHONE ANSWERING APPARATUS

[72] Inventor: Akira Konno, Shinagawa-ku, Tokyo, Japan

[73] Assignee: Pioneer Electronic

[22] Filed: Dec. 29, 1970

[21] Appl. No.: 102,465

[30] Foreign Application Priority Data

Dec. 29, 1969 Japan ........................45/2087

[52] U.S. Cl...........................179/6 R, 179/100.1 VC

[51] Int. Cl..............................................H04m 1/64

[58] Field of Search...179/6 R, 6 AC, 6 C, 100.1 VC, 179/1 VC; 340/148

[56] References Cited

UNITED STATES PATENTS 2,815,401 12/1957 O'Dwyer....................179/6 R 3,133,992 5/1964 Dickman....................179/6 R

FOREIGN PATENTS OR APPLICATIONS 249,961 3/1963 Australia..........179/100.1 VC

*Primary Examiner*—Bernard Konick
*Assistant Examiner*—Raymond F. Cardillo, Jr.
*Attorney*—Sughrue, Rothwell, Mion, Zinn & Macpeak

[57] ABSTRACT

A timer circuit for controlling the operation of an automatic telephone answering apparatus wherein an incoming message from a calling party is discriminated from continuous signals, such as dial tones, or periodic intermittent signals, such as busy tones. The apparatus is continuously operated to record an incoming message as long as the message is received, and is returned to a stand-by state after the incoming message is completed even if above-mentioned other signals are received from a telephone line.

5 Claims, 1 Drawing Figure

PATENTED AUG 29 1972 3,688,043
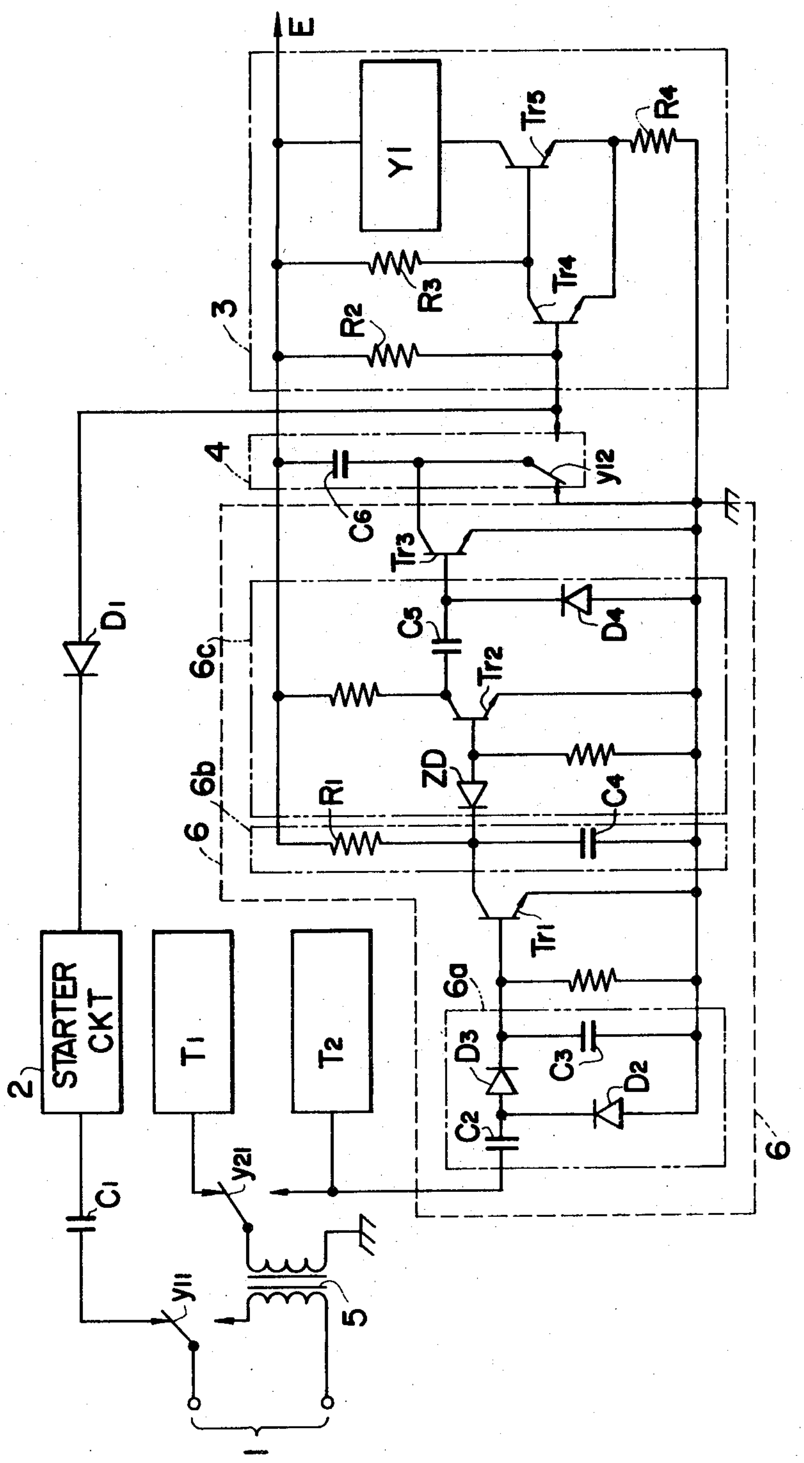
INVENTOR
AKIRA KONNO
BY
Sughrue, Rothwell, Mion,
Zinn & Macpeak ATTORNEYS

TIMER CIRCUIT OF AN AUTOMATIC TELEPHONE ANSWERING APPARATUS

BACKGROUND OF THE INVENTION

1. Field of the Invention

This invention relates generally to automatic telephone answering apparatus, and more particularly to a timer circuit for controlling the operation of the apparatus.

2. Description of the Prior Art

An ideal automatic telephone answering apparatus returns to a stand-by state at the same time a calling party hangs up the phone. A conventional automatic telephone answering apparatus, however, cannot discriminate between an incoming message and other signals, such as dial tones, busy tones or other noises. The conventional apparatus is continuously operated during a predetermined time period, then returned to a stand-by state regardless of whether the incoming message is completed or not. To use the apparatus of this type efficiently, it is desirable to provide the apparatus with a discriminating function to operate it during the periods when an incoming message is received. Recently, some ideas have been proposed to meet the demand, but they have several disadvantages. For example, a continuous operation circuit, shown in the Japanese Patent gazette (publication No. 43-23288), has some disadvantages. First, the circuit cannot discriminate an incoming message from periodic intermittent signals, such as busy tones (of which the pulse width is 0.5 seconds in Japan). Second, a timer circuit cannot start simultaneously with the reception of an incoming message because the Schmitt trigger circuit of the timer circuit is switched when a charging circuit is charged to a certain voltage by the current of the incoming message. The charging is a gradual process.

SUMMARY OF THE INVENTION

The instant invention provides a novel and improved timer circuit which eliminates the aforementioned disadvantages of a conventional automatic telephone answering apparatus by accurately discriminating between an incoming message and other signals, such as dial tones, busy tones or other similar signals.

The invention further provides a timer circuit for an automatic telephone answering apparatus whereby the automatic operation of the apparatus becomes more effective and more reliable.

Other objects, features and advantages of the present invention will become apparent from the following description and accompanying drawing.

BRIEF DESCRIPTION OF THE DRAWING

The figure shows the circuit of the preferred embodiment of the present invention.

DESCRIPTION OF THE PREFERRED EMBODIMENT

In the drawing, 1 is a terminal for a telephone line. A starter circuit 2 is connected to the terminal 1 through a condenser C1 and a contact y11. Starter circuit 2 rectifies a ringing current, which switches a switching circuit 3 between 3 to 10 seconds after receiving the first ringing current. A timer circuit 4 limits the whole operation time of this apparatus. A relay Y1 is energized by the switching circuit 3. A contact of a relay is designated, for example, as y12 which means the second contact of the first relay. Other relay contacts are similarly designated. Transformer 5 is a matching transformer. A tape recorder T1 is operated by the relay Y1 and sends out an outgoing message to a calling party. A tape recorder T2 is operated by the relay Y2, which is not shown, and records an incoming message from a calling party.

A signal discriminator circuit 6 comprises a rectifier circuit **6*a* which is composed of condensers C2 and C3 and diodes D2 and D3. A transistor Tr1 is turned ON by the output signal of the rectifier circuit 6*a*. A time constant circuit 6*b* includes a resistor R1 and a condenser C4 with the node of these two elements connected to the collector of the transistor Tr1. A pulse generating circuit 6*c* is composed of a Zener diode ZD which is turned ON when the output voltage of the time constant circuit 6b is raised to a predetermined potential. Transistor Tr2 is turned ON simultaneously with the Zener diode ZD. Circuit 6*c* also includes a condenser C5, a diode D4 and two resistors. The pulse generating circuit 6*c* generates a pulse signal when the output voltage of the time constant circuit 6*b* reaches a predetermined potential at a set time (0.7 second in this embodiment) after transistor Tr1 turns OFF. Moreover when the transistor Tr1 turns ON, that is, when signals are applied into the signal discriminator circuit 6, a transistor Tr3 is turned ON for an instant by the output pulse signal of the pulse generating circuit 6*c*. The collector of Tr3 is connected to the condenser C6 of the timer circuit 4. Busy tones are periodic pulse signals which turn ON or OFF every 0.5 seconds in Japan, while the incoming signals are irregular intermittent signals which are interrupted every second or so. Therefore, the time constant of the time constant circuit 6b should be designed to make the Zener diode ZD** turn ON 0.6 to 1.0 second from the start of charging. In this embodiment, the time constant is designed to be 0.7 second.

In operation, when a ringing current is present at the terminal 1, the signal is applied to the starter circuit 2 through a contact y11 of a relay Y1 and a coupling condenser C1. Three to 10 seconds after the first ringing current, the starter circuit 2 grounds the base of a transistor Tr4 of the switching circuit 3, through a diode D1. Transistors Tr4 and Tr5 together with resistors R2, R3 and R4 form a Schmitt trigger circuit. During the stand-by state awaiting a call, the transistor Tr4 is ON and the transistor Tr5 is OFF. If the base of the transistor Tr4 is grounded, the Schmitt trigger circuit is switched resulting in transistor Tr4 turning OFF and transistor Tr5 turning ON. Consequently, the relay Y1 operates to switch its respective contacts. The telephone line is connected with the transformer 5 through the contact y11. The condenser C6, which has been held in a charged state by means of the contact y12 of the timer circuit, is connected to the base of the transistor Tr4 by the switching of the contact y12 and discharges gradually through the resistor R2. The switching of the contact y11 stops operation of the starter circuit 2. But during a period while the condenser C6 discharges to a predetermined voltage (about ten seconds), the transistor Tr4 is held OFF by the discharging current of the condenser C6. Thus, the relay Y1 is held energized. During this time, the tape recorder T1 starts its operation by means of an undesignated contact of the relay Y1, and an outgoing message, which has previously been recorded, is sent to the calling party.

After the sending of the outgoing message, a signal, called a beep tone, is sent to the calling party to inform him that the reading of the outgoing message is completed, and that the apparatus is switching to the recording state to record an incoming message from the calling party. After the sending of the beep tone, a relay Y2 which is not shown operates, and the tape recorder T1 is stopped by means of the undesignated contact of the relay Y2, and the tape recorder T2 begins its operation to record the incoming message. The tape recorder T2 and the signal discriminator circuit 6 are connected to the transformer 5 through a contact y21 by means of the undesignated relay Y2. During this operation, the condenser C6 is discharged gradually through the resistor R2 whereby the base potential of the transistor Tr4 is raised.

The operation of the signal discriminator circuit 6 and the timer circuit 4 will now be explained in detail. When the incoming message comes from the calling party within the timer period set by the timer circuit 4, the incoming message is recorded by the tape recorder T2. At the same time, the message signal is applied to the signal discriminator circuit 6 and rectified by the rectifier circuit *6a* thereby causing the transistor Tr1 to turn ON. The Zener diode ZD and the transistor Tr2 are turned OFF, having previously been held ON by the condenser C4 which was charged to a certain voltage. Therefore, a positive pulse is fed to the base of the transistor Tr3, through the condenser C5, thereby causing the transistor Tr3 to turn ON for a period of time. Thus condenser C6 is recharged to its initial state causing the timer circuit 4 to start again. If the incoming message is continuous or is intermittent with very short intervals between signals the condenser C6 is gradually discharged during the period. If, however a signal having an intermittence of a duration of more than 0.7 second is received the transistor Tr1 is held in OFF for that duration and the condenser C4 of the time constant circuit *6b* is charged up to the certain voltage. Therefore, the Zener diode ZD and the transistor Tr2 are turned ON, the pulse generating circuit *6c* generates a pulse when the incoming message signal is again received, and the condenser C6 of the timer circuit 4 is charged through the transistor Tr3 causing the timer circuit 4 to start again.

The above operations are repeated and the automatic telephone answering apparatus is held in the recording state as long as an incoming message is received. When the calling party has completed the message, the signal discriminator circuit 6 determines that no incoming message is being received, and the timer circuit 4 is not returned to the starting state. The automatic telephone answering apparatus returns to the stand-by state after the time period of the timer circuit 4 has passed. If dial tones, which are continuous signals, are received by the automatic telephone answering apparatus after the calling party hangs up the phone and before the time period of the timer circuit 4 passes, the transistor Tr1 is turned ON by the dial tone and is continuously held ON. At the beginning of the dial tone, the pulse generating circuit *6c* generates only one pulse whereby the timer circuit 4 is returned to its starting position. Then, the automatic telephone answering apparatus is restored to a stand-by state after elapse of timer period of the timer circuit 4, since no further pulses are generated by pulse generating circuit *6c*.

Further, if busy tones, which are periodic intermittent signals having an ON or OFF state every 0.5 second, are received by the automatic telephone answering apparatus after the calling party hangs up the phone and the period of the timer circuit 4 is not elapsed, the condenser C4 of the time constant circuit *6b* is discharged every 0.5 second. The output voltage of the time constant circuit *6b* does not reach the Zener voltage of the Zener diode ZD. At the beginning of busy tones, the pulse generating circuit *6c* generates only one pulse whereby the timer circuit 4 is returned to its starting position. Then, the automatic telephone answering apparatus is restored to a stand-by state after the elapse of the period of the timer circuit 4 since no further pulses are generated by pulse generating circuit *6c*.

In this embodiment, the pulse generating circuit 6c includes the Zener diode ZD and the transistor Tr2. However, any other circuit may be substituted which generates a pulse from a signal coming from a telephone line. Further, if the condenser of the time constant circuit is a temperature compensated condenser, the time period of the timer circuit is not influenced by temperature.

The automatic telephone answering apparatus with the timer circuit of the present invention, as set forth above, has many advantages. An incoming message signal which is an irregular intermittent signal can be discriminated from periodic intermittent signals, such as busy tones, or continuous signals, such as dial tones. Further, it can be determined whether the incoming message signal is an irregular intermittent signal or no signal at all. Therefore, the automatic telephone answering apparatus is in a recording state only during the period in which the incoming message is received and is restored to stand-by state after the incoming message ends.

Further, when the pulse generating circuit is ON, the timer circuit is returned to the starting point whenever an incoming message is received. Therefore, complete incoming messages which are received during the timer period, can be recorded.

Still further, according to the present invention, the pulse generating circuit *6c* includes the Zener diode ZD, consequently the output voltage of the circuit is constant and discrimination between all types of signals can be obtained with accuracy.

While the invention has been particularly shown and described with reference to the preferred embodiment thereof, it will be understood by those skilled in the art that various changes in form and details may be made therein without departing from the spirit and scope of the invention.

I claim:

1. A timing device for an automatic telephone answering apparatus comprising:

a. a timer circuit means for initiating operation of said apparatus upon receipt of a bell signal, and for maintaining the apparatus in an operating state during the time period of the timer circuit means;

b. a rectifier circuit means for rectifying a portion of an incoming message signal received by said apparatus during the recording state of said apparatus;

c. switching means, coupled to said rectifier circuit means, said switching means being switched ON and OFF in response to the output of said rectifier circuit means;

d. time constant circuit means coupled to said switching means said time constant circuit means being returned to the beginning of its time period when said switching means is turned OFF; and e. pulse generating means, coupled to said time constant circuit means, for generating a pulse only when said switching means switches from the OFF state to the ON state after a period of time greater than the period of said time constant circuit means whereby said pulse returns said timer circuit means to the beginning of its time period.

2. The device of claim 1 wherein said pulse generating means includes a zener diode coupled to said time constant circuit means such that the zener diode reaches its firing potential when said time constant circuit means completes its time period whereby the firing of said zener diode causes said pulse to be generated.

3. The device of claim 1 wherein said switching means is a transistor switch.

4. The device of claim 3 wherein said time constant circuit means is an RC circuit.

5. The device of claim 4 wherein said timer circuit means comprises an RC circuit and a Schmitt trigger.

* * * * *